US010859364B1

(12) United States Patent
Nelson

(10) Patent No.: US 10,859,364 B1
(45) Date of Patent: Dec. 8, 2020

(54) TAPE MEASURE ATTACHMENT WITH BRUSH AND WIPER ELEMENT

(71) Applicant: Taylor Nelson, Amery, WI (US)

(72) Inventor: Taylor Nelson, Amery, WI (US)

( * ) Notice: Subject to any disclaimer, the term of this patent is extended or adjusted under 35 U.S.C. 154(b) by 0 days.

(21) Appl. No.: 16/899,672

(22) Filed: Jun. 12, 2020

Related U.S. Application Data

(60) Provisional application No. 62/957,475, filed on Jan. 6, 2020.

(51) Int. Cl.
*G01B 3/1084* (2020.01)

(52) U.S. Cl.
CPC .................. *G01B 3/1084* (2013.01)

(58) Field of Classification Search
CPC .. G01B 3/1084; G01B 3/1056; G01B 3/1089; G01B 3/1041; G01B 3/1071; G01B 3/1048; G01B 3/1094
USPC .......................................................... 33/770
See application file for complete search history.

(56) References Cited

U.S. PATENT DOCUMENTS

| | | | |
|---|---|---|---|
| 2,035,379 A | 3/1936 | Stewart | |
| 3,255,531 A * | 6/1966 | Anderson | G01B 3/1041 33/765 |
| 4,521,934 A | 6/1985 | Castle | |
| 4,583,294 A * | 4/1986 | Hutchins | G01B 3/1041 33/769 |
| 5,056,180 A * | 10/1991 | Stanton | A47L 25/00 15/104.94 |
| 5,588,220 A * | 12/1996 | Cousins | G01B 3/1084 33/768 |
| 9,846,021 B2 | 12/2017 | Zelenack, Jr. | |
| 10,012,489 B2 * | 7/2018 | Hoppe | G01B 3/1041 |
| 10,260,852 B2 | 4/2019 | Zelenack, Jr. | |
| 2012/0036727 A1* | 2/2012 | McCarthy | B43L 23/00 33/760 |
| 2016/0290776 A1* | 10/2016 | Hoppe | G01B 3/1041 |

* cited by examiner

*Primary Examiner* — Yaritza Guadalupe-McCall
(74) *Attorney, Agent, or Firm* — Boudwin Intellectual Property; Daniel Boudwin

(57) ABSTRACT

A tape measure attachment with a brush and wiper element is shown and described. The tape measure attachment with a brush and wiper element includes a front section, wherein the front section has an aperture therein. The aperture contains a brush and wiper element therein. The aperture and the brush and wiper element are proportioned to accept a tape of a measuring tape therein. The front section is attached to a base at one end of the base. A pair of prongs are attached to the base near one end of the base, wherein the prongs are configured to frictionally engage a tape measure housing. A second pair of prongs are attached to the base near one end of the base, wherein the prongs are configured to frictionally engage a tape measure housing.

19 Claims, 5 Drawing Sheets

TAPE MEASURE ATTACHMENT WITH BRUSH AND WIPER ELEMENT

CROSS REFERENCE TO RELATED APPLICATIONS

This application claims the benefit of U.S. Provisional Application No. 62/957,475 filed on Jan. 6, 2020. The above identified patent application is herein incorporated by reference in its entirety to provide continuity of disclosure.

BACKGROUND OF THE INVENTION

The present invention relates to improving tape measures to prolong usable life span. More particularly, the present invention provides a tape measure attachment with a brush and wiper element to prevent dirt and dust from entering the tape measure housing.

Tape measures are extremely useful tools. Tape measures are a necessity for most construction or building projects. Almost everyone owns a tape measure. Traditional tape measures have a retractable tape that enters a housing.

When dirt or other debris, like water or concrete for example, enter the tape measure housing tape measures may become damaged. This damage occurs as a result of the dirt and debris enter the retracting device. This may cause the tape measure to become in operable. In some cases, the retraction device may cease and not allow or the tape to be extracted or withdrawn.

Further, when a tape measure tape becomes dirty the measurements may be difficult to read. This may lead to mismeasurements. In some cases, the tape may not be able to be cleaned due to the dirt and debris becoming stuck to the tape after being pressed against the tape within the housing or concrete drying on the tape. This can lead to a useless tape measure or extended time being needed to measure items.

Consequently, there is a need for an improvement in the art of tape measures. The present invention substantially diverges in design elements from the known art while at the same time solves a problem many people face when using a tape measure. In this regard the present invention substantially fulfills these needs.

SUMMARY OF THE INVENTION

The present invention provides a tape measure attachment with a brush and wiper element wherein the same can be utilized for providing convenience for the user when using a tape measure. The tape measure attachment with a brush and wiper element is comprised of a front section, wherein the front section has an aperture therein. The aperture contains a brush and wiper element therein. The aperture and the brush and wiper element are proportioned to accept a tape of a measuring tape therein. A pair of prongs are attached to the front section, wherein the prongs are configured to frictionally engage a tape measure housing.

Another object of the tape measure attachment with a brush and wiper element is to provide an attachment that is comprised of a front section, wherein the front section has an aperture therein. The aperture contains a brush and wiper element therein. The aperture and the brush and wiper element are proportioned to accept a tape of a measuring tape therein. The front section is attached to a base at one end of the base. A pair of prongs are attached to the base near one end of the base, wherein the prongs are configured to frictionally engage a tape measure housing. A second pair of prongs are attached to the base near one end of the base, wherein the prongs are configured to frictionally engage a tape measure housing.

Another object of the tape measure attachment with a brush and wiper element is to provide a brush and wiper element is comprised of bristles.

Another object of the tape measure attachment with a brush and wiper element is to provide a brush and wiper element is comprised of a rubber shield.

Another object of the tape measure attachment with a brush and wiper element is to provide a brush and wiper element is comprised of bristles and a rubber shield.

Another object of the tape measure attachment with a brush and wiper element is to provide an adhesive located on an interior side of each of the of prongs.

Another object of the tape measure attachment with a brush and wiper element is to provide prongs that are expandable.

Another object of the tape measure attachment with a brush and wiper element is to provide a rear section attached to the base at a side opposite the front section.

Another object of the tape measure attachment with a brush and wiper element is to provide a base that has an expandable length.

Another object of the tape measure attachment with a brush and wiper element is to provide prongs that have a high friction material located on an interior side thereof.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
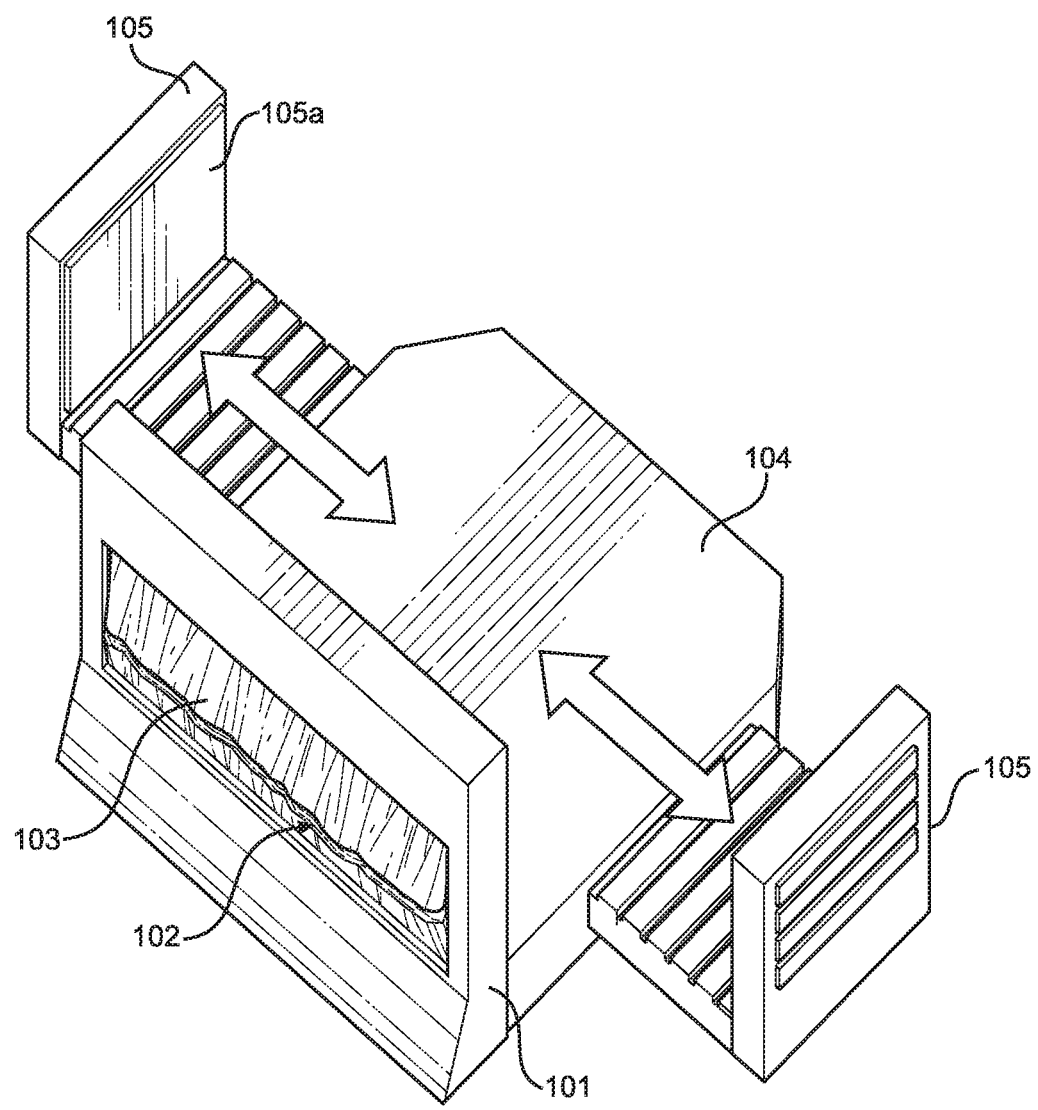
FIG. 1 shows a perspective view of an embodiment of the tape measure attachment with a brush and wiper element.

With regard to the reference numerals used, the following numbering is used throughout the drawings.

101 Front portion
102 Aperture
103 Brush and wiper element
104 Base
105 Pair of prongs
105a Interior surface of prongs
106 Rear portion
107 Second pair of prongs 107a Interior surface of second pair of prongs
201 Tape measure housing
202 Tape
501 Plurality of bristles
502 Sheet of material

DETAILED DESCRIPTION OF THE INVENTION

Reference is made herein to the attached drawings. Like reference numerals are used throughout the drawings to depict like or similar elements of the tape measure attachment with a brush and wiper element. For the purposes of presenting a brief and clear description of the present invention, a preferred embodiment will be discussed as used for the tape measure attachment with a brush and wiper element. The figures are intended for representative purposes only and should not be considered to be limiting in any respect.

Referring now to FIG. 1, there is shown a perspective view of an embodiment of the tape measure attachment with a brush and wiper element. The tape measure attachment with a brush and wiper element has a front portion 101. The front portion 101 is a planar portion of the device. The front portion 101 has an aperture 102 located therein. In the shown embodiment the aperture 102 is a rectangular aperture. The aperture 102 is configured to fit a tape of a tape measure therethrough.

The aperture 102 has a brush and wiper element 103 located therein. In one embodiment the brush and wiper element 103 is connected to a top edge of the interior of the aperture 102. In another embodiment, the brush and wiper element 103 is split into two parts having an upper brush and/or wiper and a lower brush and/or wiper. In this embodiment the upper part of the brush and wiper element 103 is attached to the top of the aperture 102 and the lower part of the brush and wiper element 103 is attached to a lower edge of the aperture 102. There will be a further description of the brush and wiper element 103 in FIG. 5A-FIG. 5C.

The front portion 101 is vertically connected to a front of a base 104. In the shown embodiment, the base 104 is the same width as the front portion 101. In other embodiments the base 104 is of other sizes. The base 104 is proportioned to fit an under side of a tape measure housing. The base 104 has a pair of prongs 105 attached thereto.

In one embodiment one of the pair of prongs 105 is attached to each side of the base 104. In one embodiment the pair of prongs 105 have a distance between an interior surface of each prong 105a. In another embodiment the pair of prongs 105 are movably attached to the base 104. This will allow the distance between the interior surface of the pair of prongs 105a to be changed.

In one embodiment the pair of prongs has a high friction material located on the interior surface of the prongs 105a. In one embodiment this material is a rubber material. In another embodiment this material is an adhesive material. The adhesive material will stick to a surface.

Figure 2:
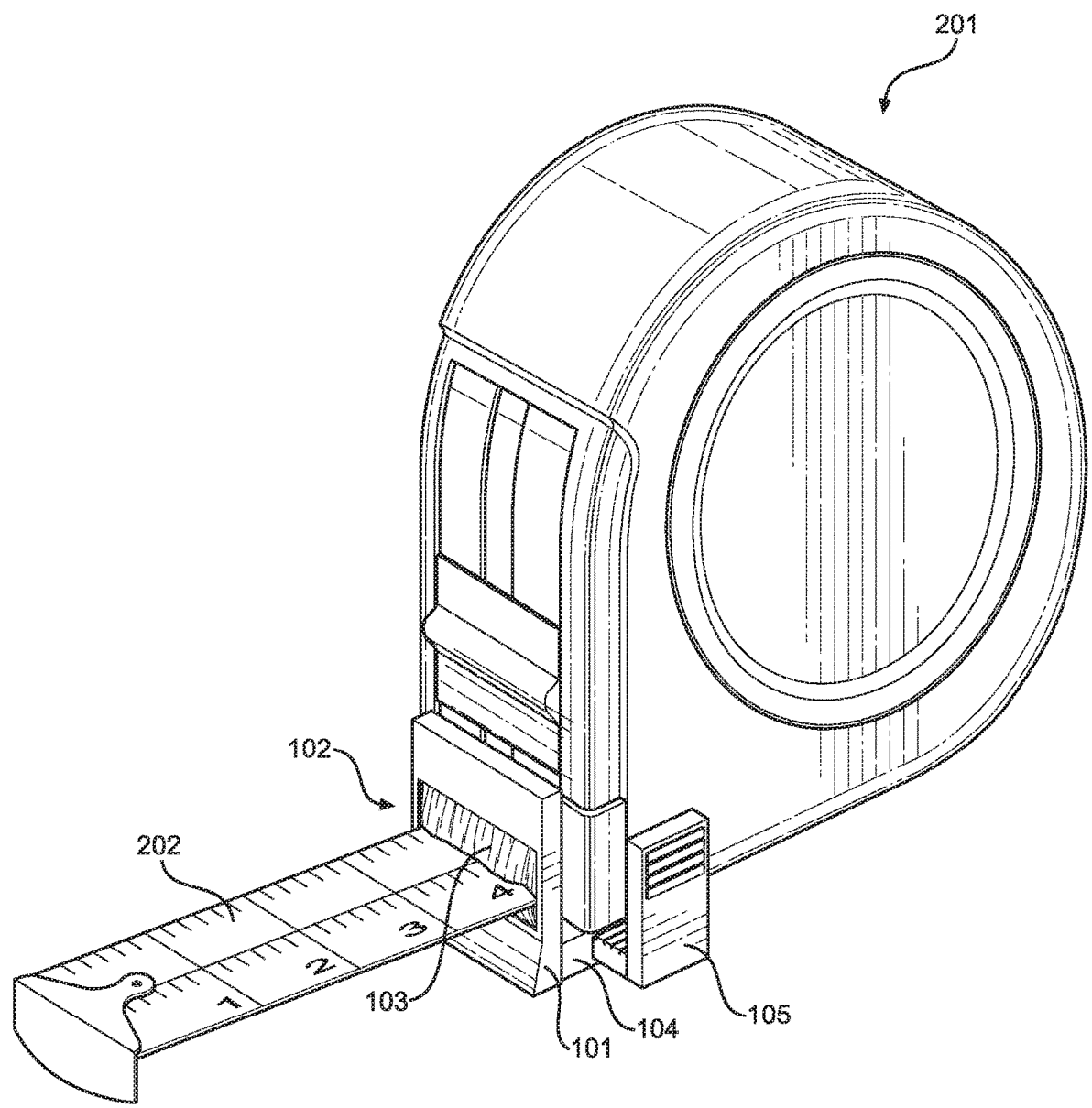
FIG. 2 shows an in-use view of an embodiment of the tape measure attachment with a brush and wiper element.

Referring now to FIG. 2, there is shown an in-use view of an embodiment of the tape measure attachment with a brush and wiper element. In use the tape measure attachment is secured to the front of a tape measure housing 201. The front portion 101 will rest against the lower front of the tape measure housing 201. The tape 202 from the tape measure will be placed through the aperture 102 in the front portion 101. The brush and wiper element 103 will rest against the tape 202. This will prevent any particles from entering the tape measure housing 201.

The base 104 of the tape measure attachment device is placed against the bottom side of the tape measure housing 201. In one embodiment the pair of prongs 105 will be the same width as the tape measure housing 201. In this embodiment the pair of prongs 105 will engage the sides of the tape measure housing 201. In another embodiment the pair of prongs 105 will be separated to fit the tape measure housing 201. This will allow the prongs to be movable from an open position to a closed position to fit various sized tape measure housings. The pair of prongs 105 will then be compressed to engage the tape measure housing 201.

Figure 3:
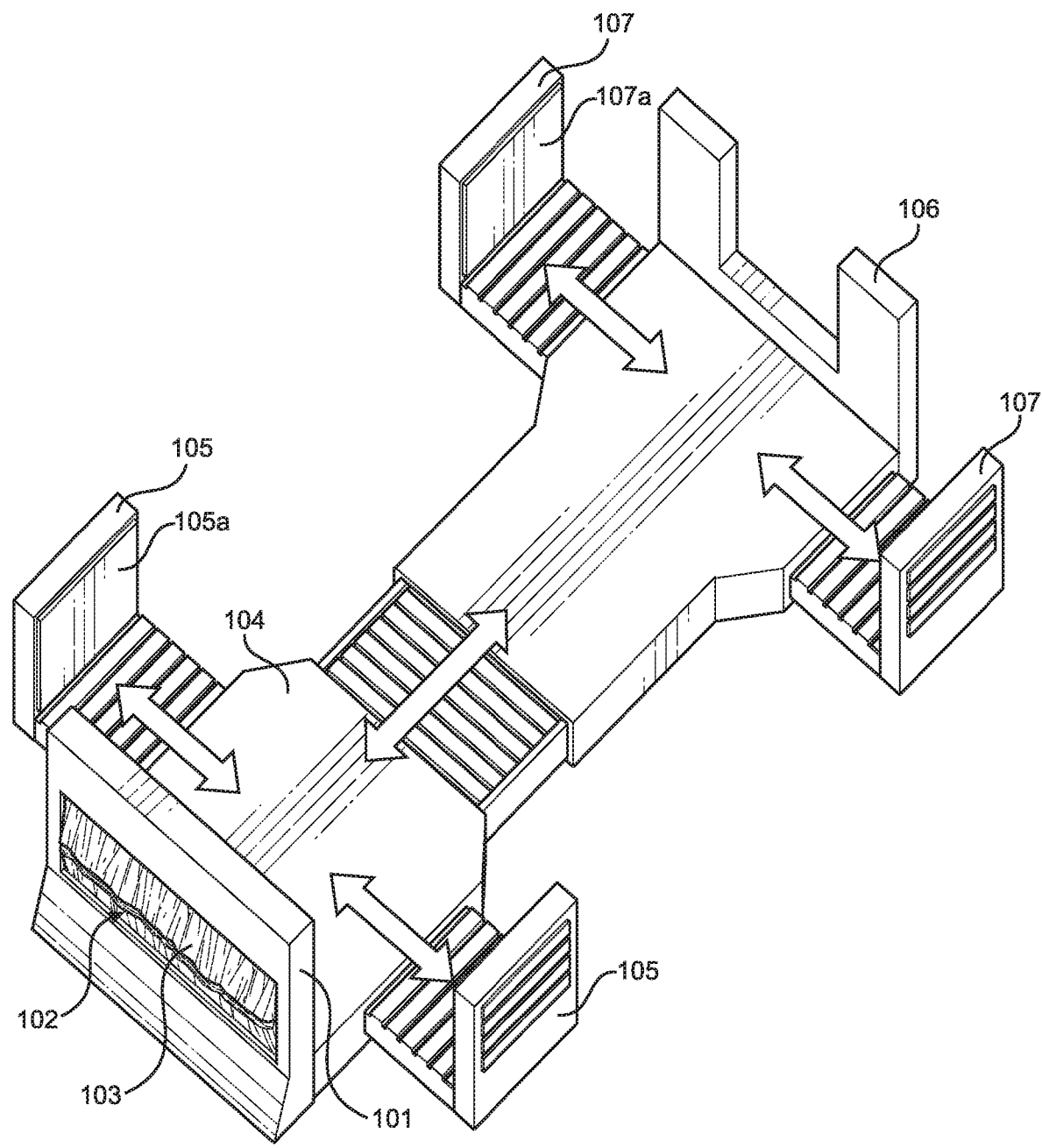
FIG. 3 shows a perspective view of an embodiment of the tape measure attachment with a brush and wiper element.

Referring now to FIG. 3, there is shown a perspective view of an embodiment of the tape measure attachment with a brush and wiper element. In the shown embodiment the tape measure attachment includes a front portion 101. The front portion 101 is a planar portion of the device. The front portion 101 has an aperture 102 located therein. In the shown embodiment the aperture 102 is a rectangular aperture. The aperture 102 is configured to fit a tape of a tape measure therethrough.

The aperture 102 has a brush and wiper element 103 located therein. In one embodiment the brush and wiper element 103 is connected to a top edge of the interior of the aperture 102. In another embodiment the brush and wiper element 103 is split into an upper part and a lower part. In this embodiment the upper part of the brush and wiper element 103 is attached to the top of the aperture 102 and the lower part of the brush and wiper element 103 is attached to a lower edge of the aperture 102. There will be a further description of the brush and wiper element in FIG. 5A-FIG. 5C.

The front portion 101 is vertically connected to a front of a base 104. In the shown embodiment, the base 104 is the same width as the front portion 101. In other embodiments the base 104 is of other sizes. The base 104 is proportioned to fit an under side of a tape measure housing. In the shown embodiment the base 104 has a rear portion added to the previously described base. This allows the base to fit along the entire length of the bottom of a tape measure housing.

In one embodiment the base is proportioned to fit along the entire underside of a tape measure housing. In this embodiment the rear of the base 104 has a rear portion 106 attached. The rear portion 106 will engage the backside of a tape measure housing. In one embodiment the base 104 has a fixed length. In another embodiment the base 104 has an adjustable length.

The base 104 has a pair of prongs 105 attached thereto. In one embodiment one of the pair of prongs 105 is attached to each side of the base 104. In one embodiment the pair of prongs 105 have a distance between the interior surface of each prong 105a. In another embodiment the pair of prongs 105 are movably attached to the base 104. This will allow the distance between the interior surface of the pair of prongs 105a to be changed.

In the shown embodiment the base 104 has a second pair of prongs 107 attached thereto. In one embodiment one of the second pair of prongs 107 is attached to each side of the base 104. In this embodiment the second pair of prongs 107 is located toward the rear of the base 104. In one embodiment the second pair of prongs 107 have a distance between an interior surface of each of the second prongs 107a. In another embodiment the second pair of prongs 107 are movably attached to the base 104. This will allow the distance between the interior surface of the second pair of prongs 107a to be changed.

In one embodiment each of the pair of prongs 105,107 has a high friction material located on the interior surface of the prongs 105a, 107a. In one embodiment this material is a rubber material. In another embodiment this material is an adhesive material. The adhesive material will stick to a surface.

Figure 4:
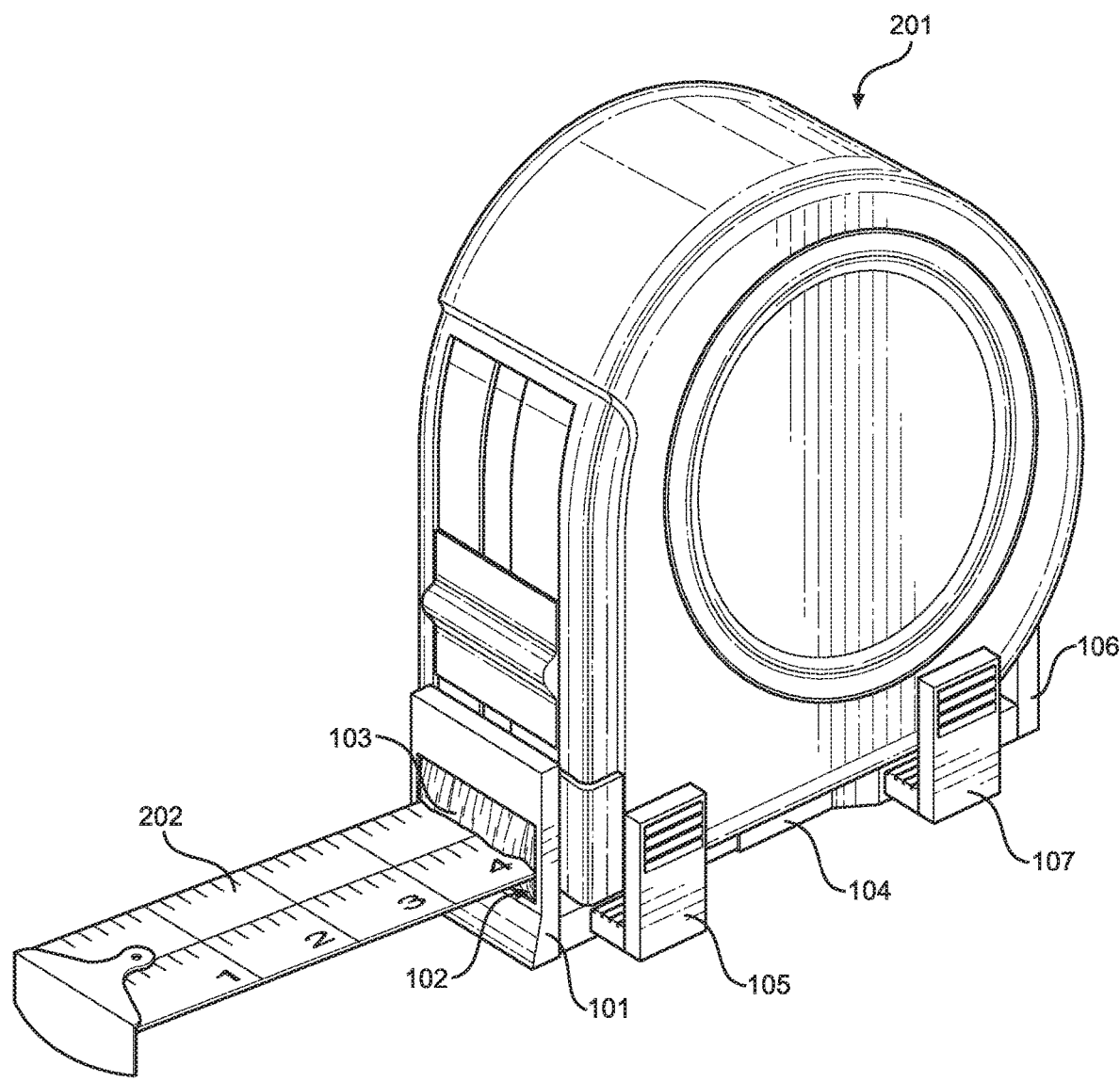
FIG. 4 shows an in-use view of an embodiment of the tape measure attachment with a brush and wiper element.

Referring now to FIG. 4, there is shown an in-use view of an embodiment of the tape measure attachment with a brush and wiper element. In use the tape measure attachment is secured to the front of a tape measure housing 201. The front portion 101 will rest against the lower front of the tape measure housing 201. The tape 202 from the tape measure will be placed through the aperture 102 in the front portion 101. The brush and wiper element 103 will rest against the tape 202. This will prevent any particles from entering the tape measure housing 201.

The base 104 of the tape measure attachment device is placed against the bottom side of the tape measure housing 201. In one embodiment the base 104 will be proportioned such that the tape measure housing 201 will frictionally engage the front portion 101 and the rear portion 106. In another embodiment the base 104 is expandable such that the base 104 will be lengthened or shortened to fit the tape measure housing 201.

In one embodiment the pair of prongs 105 will be the same width as the tape measure housing 201. In this embodiment the pair of prongs 105 will engage the sides of the tape measure housing 201. In another embodiment the pair of prongs 105 will be separated to fit the tape measure housing 201. The pair of prongs 105 will then be compressed to engage the tape measure housing 201.

In one embodiment the second pair of prongs 107 will be the same width as the tape measure housing 201. In this embodiment the second pair of prongs 107 will engage the sides of the tape measure housing 201. In another embodiment the second pair of prongs 107 will be separated to fit the tape measure housing 201. The second pair of prongs 107 will then be compressed to engage the tape measure housing 201.

Figure 5A:
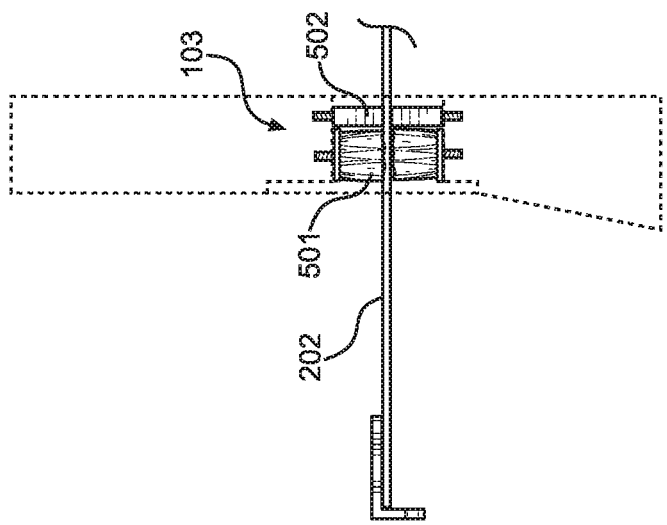
FIG. 5A shows side view of an embodiment for the brush and wiper element of the tape measure attachment.
Figure 5B:
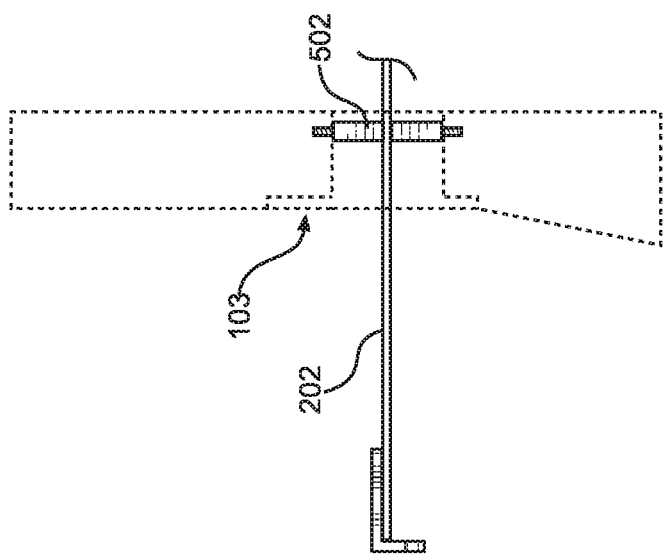
FIG. 5B shows side view of an embodiment for the brush and wiper element of the tape measure attachment.
Figure 5C:
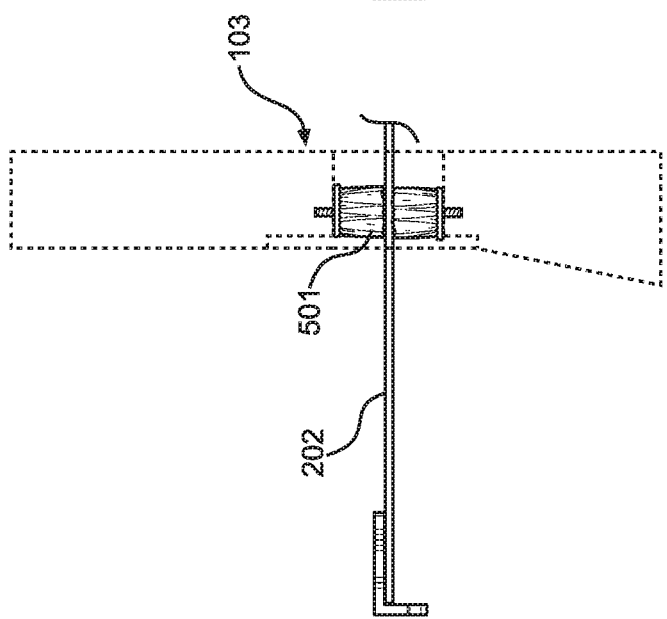
FIG. 5C shows side view of an embodiment for the brush and wiper element of the tape measure attachment.

Referring now to FIG. 5A-FIG. 5C, there is shown side views of several embodiments for the brush and wiper element of tape measure attachment. In one embodiment the brush and wiper element 103 is comprised of a plurality of bristles 501. In one embodiment the bristles 501 are made of rubber. In another embodiment the bristles 501 are made of plastic. The bristles 501 will remove debris from the tape 202 of the tape measure.

In another embodiment the brush and wiper element 103 is comprised of a single sheet of material 502. In this embodiment the single sheet of material 502 will work similar to a squeegee. The sheet of material 502 will engage the tape 202 of a tape measure removing all liquid from the tape. In one embodiment the sheet of material 502 is made from rubber.

In yet another embodiment the brush and wiper element 103 is comprised of two layers. One layer is a plurality of bristles 501. The second layer is a sheet of material 502. These layers will work together to remove all materials from the tape 202 of a tape measure. In one embodiment the plurality of bristles 501 and the sheet of material is made from the same material. In another embodiment the plurality of bristles 501 and the sheet of material 502 are made from different materials.

The brush and wiper element 103 will remove debris from the tape 202 of a tape measure as the tape enters the housing. The embodiment where the brush and wiper element 103 is comprised of a plurality of bristles 501 will allow the device to best wipe away dry debris form the tape 202. The embodiment where the brush and wiper element 103 is a sheet of material 502 will wipe away water, or other wet debris from the tape 202. The embodiment where the brush and wiper element is made from a combination of the plurality of bristles 501 and the sheet of material 502 will wipe both solid and wet debris from the tape 202. For example, concrete will be easily wiped from the tape 202 using this device. This will extend the life of a tape measure considerably.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tape measure attachment with a brush and wiper element, the attachment comprising:
    a front section, wherein the front section has an aperture therein;
    the aperture contains a brush and wiper element therein;
    the aperture and the brush and wiper element are proportioned to accept a tape of a measuring tape therein;
    a pair of prongs are attached to the front section, wherein the prongs are configured to frictionally engage an exterior of a tape measure housing.

2. The tape measure attachment of claim 1, wherein the brush and wiper element is comprised of bristles.

3. The tape measure attachment of claim 1, wherein the brush and wiper element is comprised of a rubber shield.

4. The tape measure attachment of claim 1, wherein the brush and wiper element is comprised of bristles and a rubber shield.

5. The tape measure attachment of claim 1, wherein the each of the pair of prongs has an adhesive located on an interior side thereof.

6. The tape measure attachment of claim 1, wherein the prongs are attached to the front section via a prong housing.

7. The tape measure attachment of claim 1, wherein the prongs are expandable.

8. The tape measure attachment of claim 1, wherein each of the prongs have a high friction material located on an interior side thereof.

9. The tape measure attachment of claim 1, wherein the prongs frictionally engage an exterior of the tape measure housing.

10. A tape measure attachment with a brush and wiper element, the attachment comprising:
    a front section, wherein the front section has an aperture therein;
    the aperture contains a brush and wiper element therein;
    the aperture and the brush and wiper element are proportioned to accept a tape of a measuring tape therein;

the front section is attached to a base at one end of the base;

a pair of prongs are attached to the base near one end of the base, wherein the prongs are configured to frictionally engage a tape measure housing;

a second pair of prongs are attached to the base near one end of the base, wherein the prongs are configured to frictionally engage the tape measure housing.

11. The tape measure attachment of claim 10, wherein the brush and wiper element is comprised of bristles.

12. The tape measure attachment of claim 10, wherein the brush and wiper element is comprised of a rubber shield.

13. The tape measure attachment of claim 10, wherein the brush and wiper element is comprised of bristles and a rubber shield.

14. The tape measure attachment of claim 10, wherein the each of the pair of prongs has an adhesive located on an interior side thereof.

15. The tape measure attachment of claim 10, wherein the prongs are expandable.

16. The tape measure attachment of claim 10, further comprising a rear section attached to the base at a side opposite the front section.

17. The tape measure attachment of claim 10, wherein the length of the base is expandable.

18. The tape measure attachment of claim 10, wherein each of the prongs have a high friction material located on an interior side thereof.

19. The tape measure attachment of claim 10, wherein the prongs are configured to frictionally engage an exterior of the tape measure housing;

the second pair of prongs configured to frictionally engage the exterior of the tape measure housing.

* * * * *